United States Patent
Salisbury et al.

(10) Patent No.: US 6,397,231 B1
(45) Date of Patent: May 28, 2002

(54) VIRTUAL DOCUMENTS GENERATED VIA COMBINED DOCUMENTS OR PORTIONS OF DOCUMENTS RETRIEVED FROM DATA REPOSITORIES

(75) Inventors: Michael P. Salisbury, Mountain View; James P. Dourish; Warren K. Edwards, both of San Francisco; Anthony G. LaMarca, Redwood City; John O. Lamping, Los Altos; Karin Petersen, Palo Alto; Douglas B. Terry, San Carlos; James D. Thornton, Redwood City, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/143,555

(22) Filed: Aug. 31, 1998

(51) Int. Cl.[7] .................... G06F 17/00; G06F 15/00; G06F 17/21
(52) U.S. Cl. ................ 707/515; 707/102; 707/517; 707/522
(58) Field of Search ...................... 707/515, 523, 707/517, 513, 102, 522; 434/236; 709/200, 201; 705/14

(56) References Cited

U.S. PATENT DOCUMENTS

| | | | |
|---|---|---|---|
| 5,887,133 A | * 3/1999 | Brown et al. | 709/200 |
| 5,892,909 A | * 4/1999 | Grasso et al. | 709/201 |
| 5,903,902 A | * 5/1999 | Orr et al. | 707/517 |
| 5,933,811 A | * 8/1999 | Angles et al. | 705/14 |
| 5,951,300 A | * 9/1999 | Brown | 434/236 |
| 5,956,737 A | * 9/1999 | King et al. | 707/517 |
| 6,029,182 A | * 2/2000 | Nehab et al. | 707/523 |
| 6,101,510 A | * 8/2000 | Stone et al. | 707/513 |
| 6,108,661 A | * 8/2000 | Caron et al. | 707/102 |
| 6,199,082 B1 | * 3/2001 | Ferrel et al. | 707/522 |

OTHER PUBLICATIONS

Tayeb–Bey et al., Analysis and conversion of documents, IEEE Proceedings on Pattern Recognition, vol. 2, pp. 1089–1091, Aug. 1998.*

Caplinger, Michael, An information system based on distributed objects, ACM Conference on Object Oriented Programming Systems Languages and Applications, Oct. 4–8, 1987, pp. 126–137.*

Sleeter, Melissa E., OpenDoc—building online help for a component–oriented architecture, Annual ACM Conference on Systems Documentation, Oct. 19–22, 1996, pp. 87–94.*

SLIC: An Extensibility System for Commodity Operating Systems, Ghormley et al., (Computer Science Division, Univ. of CA at Berkley), Feb. 11, 1998.

Finding and Reminding: File Organization from the desktop, Barreau et al., (SIGCHI, vol. 27, No. 3, Jul. 1995).

Finding and Reminding, Reconsidered, Fertig et al., (SIGCHI, vol. 28, No. 1, Jan. 1996).

(List continued on next page.)

Primary Examiner—Joseph H. Feild
Assistant Examiner—William L. Bashore
(74) Attorney, Agent, or Firm—Fay, Sharpe, Fagan, Minnich & McKee, LLP

(57) ABSTRACT

A virtual document generated within the environment of a document management system. The document management system provides for the separation of the document content from properties which describe the content. Bit providers are implemented to retrieve the content for a document in a manner such that the document is unaware of the location of the content which is retrieved. Generation of a virtual document recognizes that a one-to-one correlation between a document and the contents which make up that document are not required. Therefore, content for a single DMS document may be dispersed across numerous storage repositories. Alternatively, a virtual document may be a sub-portion of a file on a single repository, or a combination of such contents.

18 Claims, 7 Drawing Sheets

OTHER PUBLICATIONS

Information Visualization Using 3D Interactive Animation, Robertson et al., (Communications of the ACM, vol. 36, No. 4, Apr. 1993).

Using a Landscape Metaphor to Represent a Corpus of Documents, Matthew Chalmers, (Rank Xerox EuroPARC, in Proc. European Conf. on Spatial Information Theory, Elba, Sep. 1993).

Semantic File Systems, Gifford et al., (Programming Systems Research Group, 1991 ACM 0–89791–447–3/91/0009/0016).

A Pile Methaphor for Supporting Casual Organization of Information, Mander et al., (Chi '92, 1992 ACM 0–89791–513–5/92/0005–0627).

Representing Information about Files Jeffrey Mogul, (Computer Science Dept., Stanford, University, CH2021–4/84/0000/0432$01.00 1984 IEEE).

Interposition Agents: Transparently Interposing User Code at the System Interface, Michael B. Jones, (Microsoft Research, Microsoft Corp.) Proceedings of the 14th ACM Symposium on Operating System Principles, pp. 80–90; 1993.

Lifestreams: Organizing your Electronic Life, Freeman et al., (Yale University, Dept of Computer Science) Proceedings of the CHI 96 Conference Companion on Human Factors in Computing Systems, pp. 410–411; 1995.

The Digital Library Integrated Task Environment (DLITE), Cousins et al., (Stanford University / Xerox PARC) Jul. 1997.

\* cited by examiner

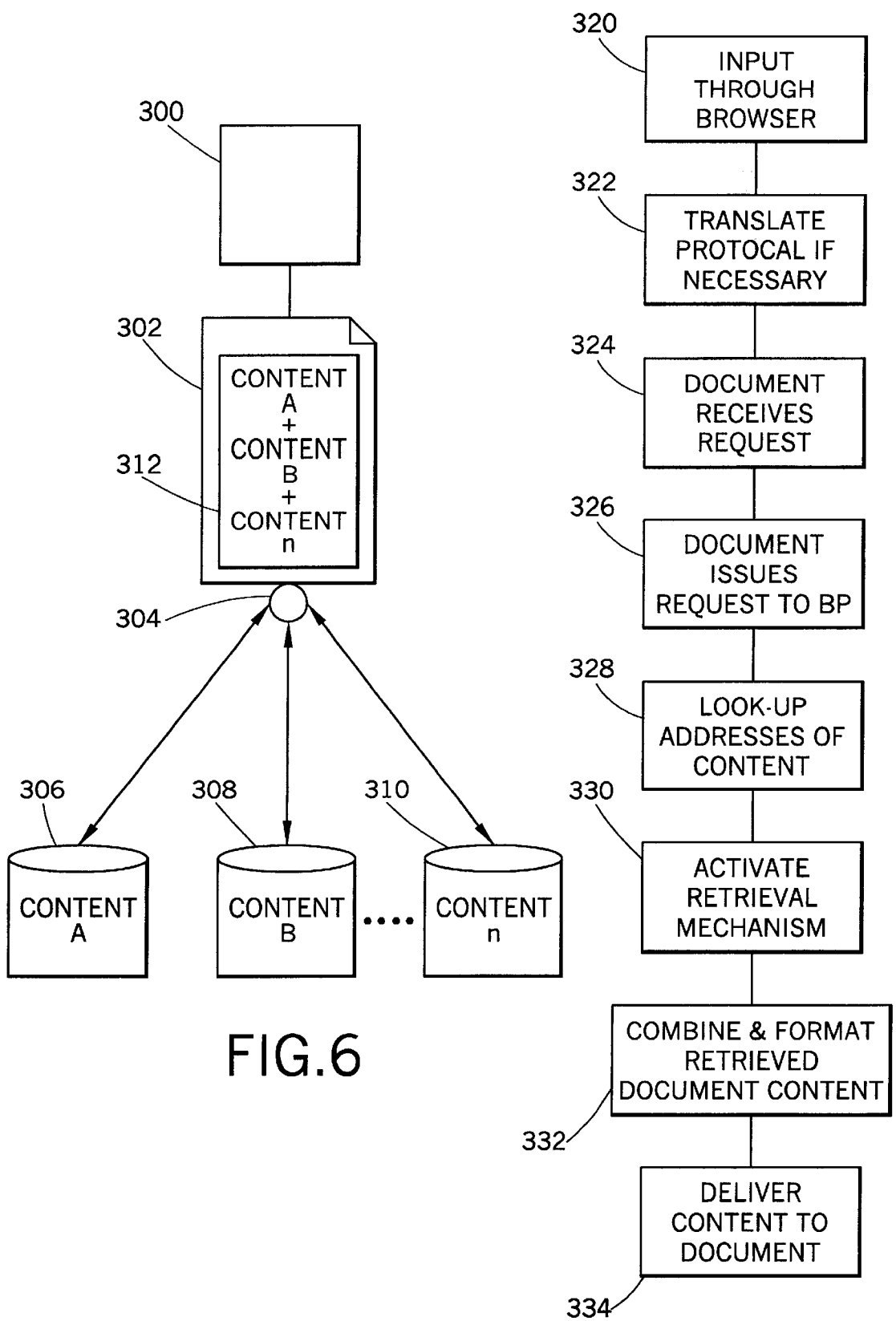

VIRTUAL DOCUMENTS GENERATED VIA COMBINED DOCUMENTS OR PORTIONS OF DOCUMENTS RETRIEVED FROM DATA REPOSITORIES

VIRTUAL DOCUMENTS

The following applications are related to the present application:

U.S. Ser. No. 09/143,802, now U.S. Pat. No. 6,266,670, Anthony G. LaMarca, et al., entitled USER LEVEL ACCESSING OF LOW-LEVEL COMPUTER SYSTEM OPERATIONS; U.S. Ser. No. 09/143,551, now U.S. Pat. No. 6,308,179, Karin Petersen, et al., entitled PROPERTY-BASED USER LEVEL DOCUMENT MANAGEMENT; U.S. Ser. No. 09/143,778, now U.S. Pat. No. 6,269,380, Douglas B. Terry, et al., entitled A PROPERTY-BASED MECHANISM FOR FLEXIBLY SUPPORTING FRONT-END AND BACK-END COMPONENTS HAVING DIFFERENT COMMUNICATION PROTOCOLS; U.S. Ser. No. 09/144,143, Warren K. Edwards, et al., entitled ATOMIC AND MOLECULAR DOCUMENTS; U.S. Ser. No. 09/144,383, now U.S. Pat. No. 6,324,551, John O. Lamping, et al, entitled SELF CONTAINED DOCUMENT MANAGEMENT BASED ON DOCUMENT PROPERTIES; U.S. Ser. No. 09,145,773, now U.S. Pat. No. 6,240,428, James D. Thornton, et al., entitled SERVICE INTERACTION USING PROPERTIES ATTACHED TO DOCUMENTS; U.S. Ser. No. 09/144,231, now U.S. Pat. No. 6,253,217, James P. Dourish, et al., entitled ACTIVE PROPERTIES FOR DYNAMIC SYSTEM CONFIGURATION; U.S. Ser. No. 09/143,777, Warren K. Edwards, et al., entitled EXTENDING APPLICATION BEHAVIOR THROUGH DOCUMENT PROPERTIES; U.S. Ser. No. 09/143,772, now U.S. Pat. No. 6,330,573, Michael P. Salisbury, et al., entitled MAINTAINING DOCUMENT IDENTITY ACROSS FILE SYSTEM INTERFACES; U.S. Ser. No. 09/144,032, now U.S. Pat. No. 6,266,682, Anthony G. LaMarca, et al, entitled CLUSTERING RELATED FILES IN A DOCUMENT MANAGEMENT SYSTEM.

Each of the above applications filed Aug. 31, 1998 and commonly assigned are hereby incorporated by reference.

BACKGROUND OF THE INVENTION

The present invention pertains to the art of document configuration and more particularly to configuration of a document in a document management system which stores the contents of a document separate from the properties of the document. The contents of the document are retrieved by a bit provider that delivers the content to the document from external storage repositories without informing the document as to the location where the content is stored.

The inventors have recognized that a large amount of a user's interaction with a computer has to do with document management, such as storing, filing, organizing and retrieving information from a variety of electronic documents. These documents may be found on a local disc, on a network system file server, an e-mail file server, the world wide web, or a variety of other locations. Modern communication delivery systems have had the effect of greatly increasing the flow of documents which may be incorporated within a user's document space, thereby increasing the need for better tools to visualize and interact with the accumulated documents.

The most common tools for organizing a document space rely on a single fundamental mechanism known as hierarchical storage systems, wherein documents are treated as files that exist in directories or folders, which are themselves contained in other directories, thereby creating a hierarchy that provides the structure for document space interactions. Each directory in a hierarchy of directories, will commonly contain a number of individual files. Typically, files and directories are given alpha-numeric, mnemonic names in large storage volumes shared via a network. In such a network, individual users may be assigned specific directories.

A file located in a sub-directory is located by its compound path name. For example, the character string D:\TREE\LIMB\BRANCH\TWIG\LEAF.FIL could describe the location of a file LEAF.FIL whose immediate directory is TWIG and which is located deep in a hierarchy of files on the drive identified by the letter D. Each directory is itself a file containing file name, size, location data, and date and time of file creation or changes.

Navigation through a file system, to a large degree, can be considered as navigation through semantic structures that have been mapped onto the file hierarchy. Such navigation is normally accomplished by the use of browsers and dialog boxes. Thus, when a user traverses through the file system to obtain a file (LEAF.FIL), this movement can be seen not only as a movement from one file or folder to another, but also as a search procedure that exploits features of the documents to progressively focus on a smaller and smaller set of potential documents. The structure of the search is mapped onto the hierarchy provided by the file system, since the hierarchy is essentially the only existing mechanism available to organize files. However, documents and files are not the same thing.

Since files are grouped by directories, associating a single document with several different content groupings is cumbersome. The directory hierarchy is also used to control the access to documents, with access controls placed at every node of the hierarchy, which makes it difficult to grant file access to only one or a few people. In the present invention, separation of a document's inherent identity from its properties, including its membership in various document collections, alleviates these problems.

Other drawbacks include that existing hierarchical file systems provide a "single inheritance" structure. Specifically, files can only be in one place at a time, and so can occupy only one spot in the semantic structure. The use of links and aliases are attempts to improve upon such a limitation. Thus, while a user's conception of a structure by which files should be organized may change over time, the hierarchy described above is fixed and rigid. While moving individual files within such a structure is a fairly straightforward task, reorganizing large sets of files is much more complicated, inefficient and time consuming. From the foregoing it can be seen that existing systems do not address a user's need to alter a file structure based on categories which change over time. At one moment a user may wish to organize the document space in terms of projects, while at some time in the future the user may wish to generate an organization according to time and/or according to document content. A strict hierarchical structure does not allow management of documents for multiple views in a seamless manner resulting in a decrease in the efficiency of document retrieval.

Existing file systems also support only a single model for storage and retrieval of documents. This means a document is retrieved in accordance with a structure or concepts given to it by its author. On the other hand, a user who is not the author may wish to retrieve a document in accordance with a concept or grouping different from how the document was stored.

Further, since document management takes place on a device having computational power, there would be benefits to harnessing the computational power to assist in the organization of the documents. For example, by attaching a spell-checker property to a document, it can extend the read operation of a document so that the content returned to the requesting application will be correctly spelled.

The inventors are aware that others have studied the area of document management/storage systems.

DMA is a proposed standard from AIIM designed to allow document management systems from different vendors to interoperate. The DMA standard covers both client and server interfaces and supports useful functionality including collections, versioning, renditions, and multiple-repository search. A look at the APIs show that DMA objects (documents) can have properties attached to them. The properties are strongly typed in DMA and must be chosen from a limited set (string, int, date . . . ). To allow for rich kinds of properties, one of the allowable property types is another DMA object. A list type is allowed to build up big properties. Properties have a unique IDs in DMA. Among the differences which exist to the present invention, is the properties are attached to documents without differentiation about which user would like to see them; properties are stored in the document repository that provides the DMA interface, not independently from it. Similarly, DMA does not provide support for active properties.

WebDAV is another interface designed to allow an extended uniform set of functionality to be attached with documents available through a web server. WebDAV is a set of extensions to the HTTP 1.1 protocol that allow Web clients to create and edit documents over the Web. It also defines collections and a mechanism for associating arbitrary properties with resources. WebDAV also provides a means for creating typed links between any two documents, regardless of media type where previously, only HTML documents could contain links. Compared to the present invention, although WebDAV provides support for collections, these are defined by extension (that is all components have to be explicitly defined); and although it provides arbitrary document properties, these live with the document itself and cannot be independently defined for different users, furthermore there is no support for active properties and are mostly geared toward having ASCII (or XML) values.

DocuShare is a simple document management system built as a web-server by Xerox Corporation. It supports simple collections of documents, limited sets of properties on documents and support for a few non-traditional document types like calendars and bulletin boards. It is primarily geared toward sharing of documents of small, self-defined groups (for the latter, it has support to dynamically create users and their permissions.) DocuShare has notions of content providers, but these are not exchangeable for a document. Content providers are associated with the type of the document being accessed. In DocuShare properties are static, and the list of properties that can be associated with a document depends on the document type. Users cannot easily extend this list. System administrators must configure the site to extend the list of default properties associated with document types, which is another contrast to the present invention. Also, in DocuShare properties can be visible to anyone who has read access for the collection in which the document is in. Properties are tightly bound to documents and it is generally difficult to maintain a personalized set of properties for a document, again a different approach than the one described in the present invention.

An operating system "SPIN" from the University of Washington allows users to inject code into the kernel that is invoked when an appropriate system call or system state occurs (For example, users can inject code that alters paging decision.). Their technology could be used to make it possible to inject code into the file system to invoke a user's code on read and write. Among the differences between SPIN and the concepts of present invention are that code injected into SPIN runs at the kernel level and users can only express their behaviors in a restricted, safe language in which it is not possible to do "bad things." As such, expressiveness is limited. On the other hand, the properties in the present invention run at the user level, and can have GUIs call out to third party libraries and in general be far more expressive than a kernel injected spindle. Further, the properties of the present invention are expressed in terms of documents, as in "I attach property X to Document Y." The SPIN system, on the other hand, extends a system call such as "read" on all files. The example document specific behaviors mentioned above are more easily mapped into a system such as the present invention in which properties are explicitly attached to individual documents.

Other works which have been done which allow operating system calls to be extended into user's code include, the article "Interposition Agents: Transparently Interposing User Code and System Interface," by Michael B. Jones in Proceedings of the 14$^{th}$ Symposium on Operating Systems, Principles, Ashville, N.C., December, 1993, pages 80–93. The article "SLIC: An Extensibility System for Commodity Operating Systems," by Douglas P. Ghormley, Steven H. Rodriguez, David Petrou, Thomas E. Anderson, which is to appear in the USENIX 1998 Annual Technical Conference, New Orleans, La., June 1998.

Further, Windows NT (from Microsoft) has a function called "Filter Drivers" which, once installed, can see the accesses made to a file system. Like SPIN, a filter driver is involved on operations on all filters instead of on a document by document basis. Furthermore, installing filter drivers is a privileged operation, it is not available to normal users. As such, a user level mechanism, such as the document properties of the present invention and event dispatching architecture would be needed to allow users to express their desired behaviors.

There are also systems which, in a very specific domain, allow users to apply behaviors when documents are accessed. An example is the Tandem e-mail system, which has a "screen cobol" language and has hooks to find out when things occur. This system allows users to code filters to do custom operations when documents arrive and/or read. One of the differences between this system and the present invention, is that that system solves the problem in a specific domain and invokes only the user's behaviors when the documents are accessed via the mail application. In the present invention, the behaviors are invoked regardless of the application and regardless of the interface.

The paper, "Finding and Reminding: File Organization From the Desktop", D. Barreau and B. Nardi, SIGCHI Bulletin, 27 (3) July, 1995, reviews filing and retrieval practices and discusses the shortcomings of traditional file and retrieval mechanisms. The paper illustrates that most users do not employ elaborate or deep filing systems, but rather show a preference for simple structures and "location-based searches", exploiting groupings of files (either in folders, or on the computer desktop) to express patterns or relationships between documents and to aid in retrieval. In response to the Barreau article, the article, "Find and Reminding Reconsidered", by S. Fertig, E. Freeman and D.

Gelernter, SIGCHI Bulletin, 28(1) January, 1996, defends deep structure and search queries, observing that location-based retrieval is, "nothing more than a user-controlled logical search." There is, however, one clear feature of location-based searching which adds to a simple logical search—in a location-based system, the documents have been subject to some sort of pre-categorization. Additional structure is then introduced into the space, and this structure is exploited in search and retrieval.

The article "Information Visualization Using 3D Interactive Animation", by G. Robertson, S. Card and J. Mackinlay, Communications of the ACM 36 (4) April, 1993, discusses a location-based structure, an interesting feature is that it is exploited perceptually, rather than cognitively. This moves the burden of retrieval effort from the cognitive to the perceptual system. While this approach may be effective, the information that the systems rely on is content-based, and extracting this information to find the structure can be computationally expensive.

The article "Using a Landscape Metaphor to Represent a Corpus of Documents," Proc. European Conference on Spatial Information Theory, Elba, September, 1993, by M. Chalmers, describes a landscape metaphor in which relative document positions are derived from content similarity metrics. A system, discussed in "Lifestreams: Organizing your Electronic Life", AAAI Fall Symposium: AI Applications in Knowledge Navigation on Retrieval (Cambridge, Mass.), E. Freeman and S. Fertig, November, 1995, uses a timeline as the major organizational resource for managing document spaces. Lifestreams is inspired by the problems of a standard single-inheritance file hierarchy, and seeks to use contextual information to guide document retrieval. However, Lifestreams replaces one superordinate aspect of the document (its location in the hierarchy) with another (its location in the timeline).

The article "Semantic File Systems" by Gifford et al., Proc. Thirteenth ACM Symposium of Operating Systems Principals (Pacific Grove, Calif.) October, 1991, introduces the notion of "virtual directories" that are implemented as dynamic queries on databases of document characteristics. The goal of this work was to integrate an associating search/retrieval mechanism into a conventional (UNIX) file system. In addition, their query engine supports arbitrary "transducers" to generate data tables for different sorts of files. Semantic File System research is largely concerned with direct integration into a file system so that it could extend the richness of command line programming interfaces, and so it introduces no interface features at all other than the file name/query language syntax. In contrast, the present invention is concerned with a more general paradigm based on a distributed, multi-principal property-based system and with how interfaces can be revised and augmented to deal with it; the fact that the present invention can act as a file system is simply in order to support existing file system-based applications, rather than as an end in itself DLITE is the Stanford Digital Libraries Integrated Task Environment, which is a user interface for accessing digital library resources as described in "The Digital Library Integrated Task Environment" Technical Report SIDL-WP-1996-0049, Stanford Digital Libraries Project (Palo Alto, Calif.) 1996, by S. Cousins et al. DLITE explicitly reifies queries and search engines in order to provide users with direct access to dynamic collections. The goal of DLITE, however, is to provide a unified interface to a variety of search engines, rather than to create new models of searching and retrieval. So although queries in DLITE are independent of particular search engines, they are not integrated with collections as a uniform organizational mechanism.

Multivalent documents define documents as comprising multiple "layers" of distinct but intimately-related content. Small dynamically-loaded program objects, or "behaviors", activate the content and work in concert with each other and layers of content to support arbitrarily specialized document types. To quote from one of their papers, "A document management infrastructure built around a multivalent perspective can provide an extensible, networked system that supports incremental addition of content, incremental addition of interaction with the user and with other components, reuse of content across behaviors, reuse of behaviors across types of documents, and efficient use of network bandwidth."

Multivalent document behaviors (analogs to properties) extend and parse the content layers, each of which is expressed in some format. Behaviors are tasked with understanding the formats and adding functionality to the document based on this understanding. In many ways, the Multivalent document system is an attempt at creating an infrastructure that can deal with the document format problem by incrementally adding layers of "understanding" of various formats. In contrast, the present invention has an explicit goal of exploring and developing a set of properties that are independent of document format. While properties could be developed that could parse and understand content, it is expected that most will be concerned with underlying storage, replication, security, and ownership attributes of the documents. Included among the differences between the present invention and the Multivalent concepts are that, the Multivalent document system focuses on extensibility as a tool for content presentation and new content-based behaviors; the present invention focuses on extensible and incrementally-added properties as a user-visible notion to control document storage and management.

File systems known as the Andrew File System (AFS), Coda, and Ficus provide a uniform name space for accessing files that may be distributed and replicated across a number of servers. Some distributed file systems support clients that run on a variety of platforms. Some support disconnected file access through caching or replication. For example, Coda provides disconnected access through caching, while Ficus uses replication. Although the immediately described distributed file systems support document (or file) sharing, they have a problem in that a file's hierarchical pathname and its storage location and system behavior are deeply related. The place in the directory hierarchy where a document gets stored generally determines on which servers that file resides.

Distributed databases such as Oracle, SQL Server, Bayou, and Lotus Notes also support shared, uniform access to data and often provide replication. Like some distributed file systems, many of today's commercial databases provide support for disconnected operation and automatic conflict resolution. They also provide much better query facilities than file systems. However, distributed databases suffer the same problems as file systems in that the properties of the data, such as where it is replicated and how it is indexed and so on, are generally associated with the tables in which that data resides. Thus, these properties cannot be flexibly managed and updated. Also, the set of possible properties is not extensible.

A digital library system, known as the Documentum DocPage repository, creates a document space called a "DocBase." This repository stores a document as an object that encapsulates the document's content along with its attributes, including relationships, associated versions, renditions, formats, workflow characteristics, and security.

These document objects can be infinitely combined and re-combined on demand to form dynamic configurations of document objects that can come from any source.

DocPage supports organization of documents via folder and cabinet metaphors, and allows searching over both document content and attributes. The system also provides check in/checkout-style version control, full version histories of documents, and annotations (each with its own attributes and security rules). The system also supports workflow-style features including notification of updates. DocBase uses a replicated infrastructure for document storage (see: http://www.documentum.com).

Among the key differences between Documentum DocPage and the present invention are: First, in the present system properties are exposed as a fundamental concept in the infrastructure. Further, the present system provides for a radically extensible document property infrastructure capable of supporting an aftermarket in document attributes. Documentum seems to be rather closed in comparison; the possible attributes a document can acquire are defined a priori by the system for a particular application environment and cannot be easily extended. Second, Documentum does not have the vision of universal access to the degree of the present invention which supports near-universal access to document meta-data, if not document content. In comparison, the scope of Documentum narrows to document access within a closed setting (a corporate intranet).

SUMMARY OF THE INVENTION

A document is an entity comprising identity, properties, and content. This definition permits document functionality including accessing properties, renaming, comparing for equality, and passing references.

The present invention contemplates generation of a virtual document constructed within the environment of a document management system that separates the content of a document from properties which are used to describe the document. The document management system further includes bit providers which retrieve the content portion of the document and deliver it to the document.

The document is unaware of the storage location of the content. In the case where a document system provides an interface to an underlying document storage repository, the generated virtual document capitalizes on the concept that a one-to-one correlation between the offered documents and the underlying documents is not required in the document management system.

With attention to a more limited aspect of the present invention, a document according to the teachings of the present invention is comprised of documents stored in more than a single document storage repository.

With attention to yet another aspect of the present invention, the document is comprised of a sub-portion of a file located in a document storage repository.

With attention to still another aspect of the present invention, the document is composed from documents in a plurality of document storage repositories where at least one of the sub-documents of the document is a sub-portion of a file.

With attention to still yet another aspect of the present invention, a bit provider retrieves the content from the different repositories, and then combines the content into a form which is perceived by a viewer as a single document.

A principal advantage of the present invention is creation of documents independent of their storage location such that a single document may consist of content from multiple repositories and/or segments of a larger file.

A further advantage of the present invention is that a bit provider combines the multiple portions of documents into a unified document, which from the perspective of users may be used and reviewed as if it were from a single document storage repository.

Yet another advantage of the present invention is that the virtual documents may be generated from sources independent of any repositories, e.g., on-line weather repositories, stock market tickers, etc., which may be accessible through protocols that are not document repository specific.

Another advantage of the present invention is that virtual documents are full-fledged DMS documents, affording all the benefits thereof. Particularly, virtual documents can be managed as full-fledged documents, with properties or as part of collections or extractions of information in repositories.

Still a further advantage of the present invention is increasing the ease with which a user may organize a document, wherein the user may review the overall document or sub-sections of the document may be presented as their own stand-alone documents.

Still other advantages and benefits will become apparent to those skilled in the art upon a reading and understanding of the following detailed description.

DESCRIPTION OF THE DRAWINGS

The invention may take physical form in certain parts and arrangement of parts, a preferred embodiment of which will be described in detail in this specification and illustrated in the accompanying drawings which form a part hereof, and wherein:

FIG. 6 illustrates a virtual document wherein the content is retrieved from more than one storage repository;

FIG. 7 is a flow chart with regard to FIG. 6;

DETAILED DESCRIPTION OF THE PREFERRED EMBODIMENTS

Figure 1:
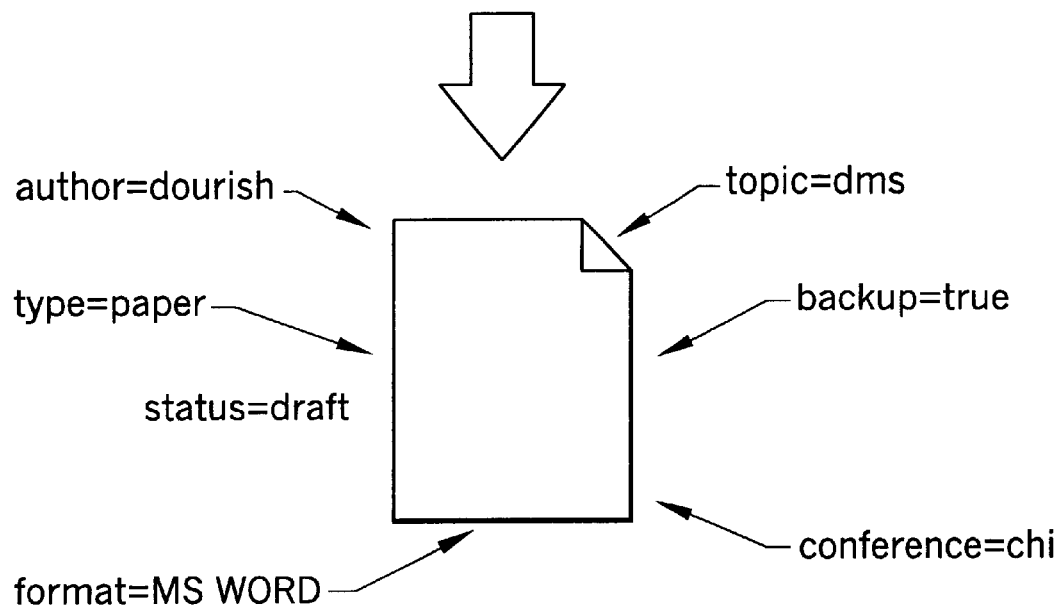
FIG. 1 shows a hierarchical storage mechanism compared to the concept of properties of the present invention.

Prior to discussing the present invention in greater detail, it is believed a glossary of terms used in the description would be beneficial. Therefore, the following definitions are set forth:

Action: The behavior part of a property.

Active Property: A property in which code allows the use of computational power to either alter the document or effect another change within the document management system.

Arbitrary: Ability to provide any property onto a document.

Base Document: Corresponds to the essential bits of a document. There is only one Base Document per document. It is responsible for determining a document's content and may contain properties of the document, and it is part of every principal's view of the document.

Base Properties: Inherent document properties that are associated with a Base Document.

Bit Provider: A special property of the base document. It provides the content for the document by offering read and write operations. It can also offer additional operations such as fetching various versions of the document, or the encrypted version of the content.

Browser: A user interface which allows a user to locate and organize documents.

Collection: A type of document that contains other documents as its content.

Combined Document: A document which includes members of a collection and content.

Content: This is the core information contained within a document, such as the words in a letter, or the body of an e-mail message.

Content Document: A document which has content.

Distributed: Capability of the system to control storage of documents in different systems (i.e., file systems, www, e-mail servers, etc.) in a manner invisible to a user. The system allows for documents located in multi-repositories to be provided to a principal without requiring the principal to have knowledge as to where any of the document's content is stored.

DMS: Document Management System

Document: This refers to a particular content and to any properties attached to the content. The content referred to may be a direct referral or an indirect referral. The smallest element of the DMS. There are four types of documents; Collection, Content Document, No-Content Document and Combined Document.

Document Handle: Corresponds to a particular view on a document, either the universal view, or that of one principal.

DocumentID: A unique identifier for each Base Document. A Reference Document inherits the DocumentID from its referent. Document identity is thus established via the connections between Reference Documents and Base Documents. Logically, a single document is a Base Document and any Reference Documents that refer to it.

Kernel: Manages all operations on a document. A principal may have more than one kernel.

Multi-Principal: Ability for multiple principals to have their own set of properties on a Base Document wherein the properties of each principal may be different.

Notification: Allows properties and external devices to find out about operations and events that occur elsewhere in DMS.

No Content Document: A document which contains only properties.

Off-the-Shelf Applications: Existing applications that use protocols and document storage mechanisms provided by currently operating systems.

Principal: A "User" of the system. Each person or thing that uses the document management system is a principal. A group of people can also be a principal. Principals are central because each property on a document can be associated with a principal. This allows different principals to have different perspectives on the same document.

Property: Some bit of information or behavior that can be attached to content. Adding properties to content does not change the content's identity. Properties are tags that can be placed on documents, each property has a name and a value (and optionally a set of methods that can be invoked).

Property Generator: Special case application to extract properties from the content of a document.

Reference Document: Corresponds to one principal's view of a document. It contains a reference to a Base Document (Reference Document A refers to Base Document B) and generally also contains additional properties. Properties added by a Reference Document belong only to that reference; for another principal to see these properties, it must explicitly request them. Thus, the view seen by a principal through his Reference Document is the document's content (through the Base Document), and a set of properties (both in the reference and on the Base Document). Even an owner of a Base Document can also have a Reference Document to that base, in which he places personal properties of the document that should not be considered an essential part of the document and placed in all other principal's view.

Space: The set of documents (base or references) owned by a principal.

Static Property: A name-value pair associated with the document. Unlike active properties, static properties have no behavior. Provides searchable meta-data information about a document.

Introduction

As discussed in the background of the invention, the structure that file systems provide for managing files becomes the structure by which users organize and interact with documents. However, documents and files are not the same thing. The present invention has as an immediate goal to separate management of properties related to the document or concerning the document from the management of the document content. Therefore, user-specific document properties are managed close to the document consumer or user of the document rather than where the document is stored. Separation of the management of user properties from the document content itself provides the ability to move control of document management from a closed file system concept to a user-based methodology.

FIG. 1 illustrates a distinction between hierarchical storage systems whose documents are organized in accordance with their location described by a hierarchical structure and the present invention where documents are organized according to their properties (e.g. author=dourish, type=paper, status=draft, etc.). This means documents will retain properties even when moved from one location to another, and that property assignment can have a fine granularity.

Figure 2:
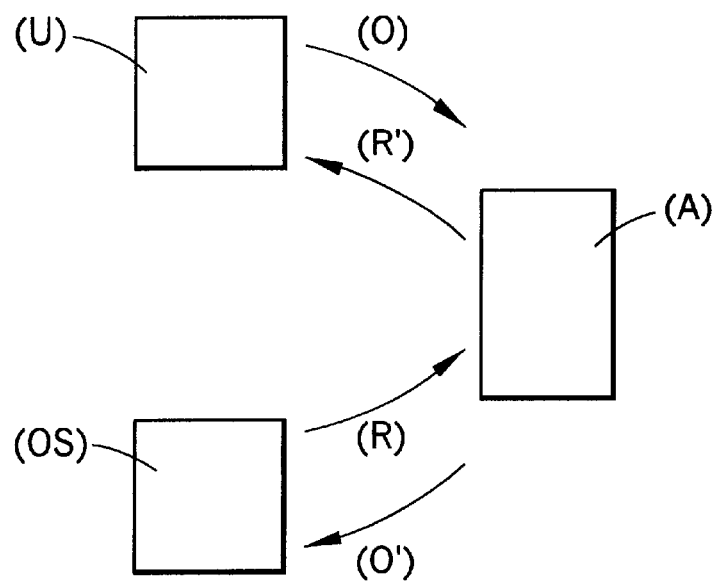
FIG. 2 is a block diagram of a document management system according to the present invention, interposed within a communication channel between a user and an operating system.

To integrate properties within the document management system of the present invention, the properties need to be presented within the content and/or property read/write path of a computer system, with the ability to both change the results of an operation as well as take other actions. The outline of the concept is described in FIG. 2, where once user (U) issues an operation request (O), prior to that operation being performed by operating system (OS), a call is made to document management system (DMS) A of the present invention, which allows DMS A to function so as to achieve the intended concepts of the present invention. This includes having DMS A interact with operating system (OS), through its own operation request (O'). Once operation request (O') is completed, the results are returned (R) to DMS A which in turn presents results (R') to user (U).

With these basic concepts having been presented, a more detailed discussion of the invention is set forth below.

Document Management System (DMS) Architecture

Figure 3:
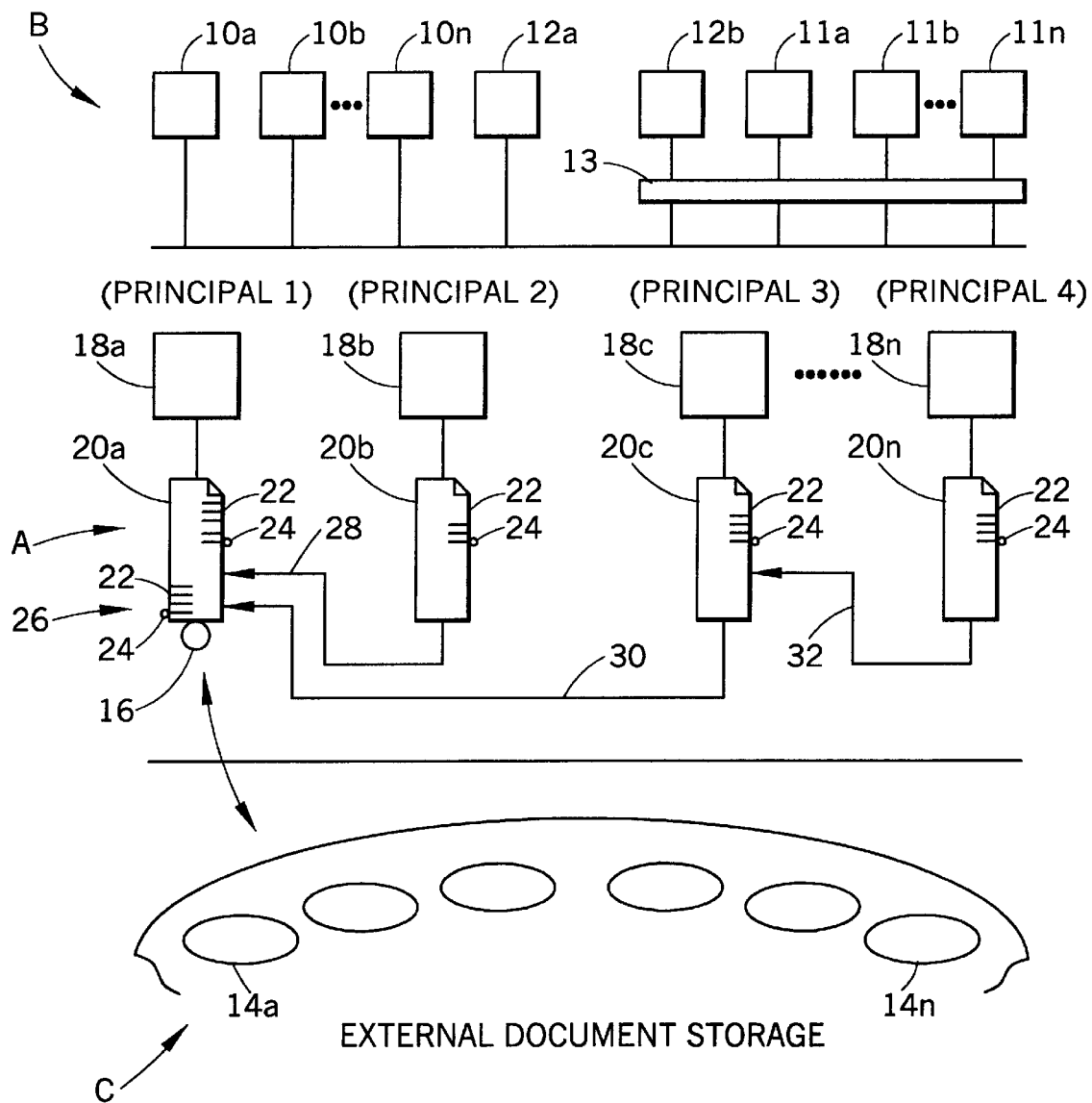
FIG. 3 is a representation of a document management system of the present invention implemented in a computer system which is DMS-aware.

FIG. 3 sets forth the architecture of a document management system (DMS) A of the present invention.

Document management system (DMS) A is shown connected for operation with front-end components B, and back-end components C. Front-end components B include applications 11a–11n, such as word processing applications, mail applications among others. Some of the applications are considered DMS aware 10a–10n which means these applications understand DMS protocols for storing, retrieving and otherwise interacting with DMS A. Other components are considered non-DMS aware 11a–11n. Browsers 12a (DMS aware) and 12b (non-DMS aware) are considered specialized forms of applications in order for the non-DMS aware applications 11a–11n and 12b to be able to communicate with DMS A, front-end translators or translation layer 13.

Similarly, back-end components C can include a plurality of repositories 14a–14n, where the content of documents are stored. Such repositories can include the hard disc of a principal's computer, a file system server, a web page, a dynamic real time data transmission source, as well as other data repositories. To retrieve data content from repositories 14a–14n, bit providers, such as bit provider 16, are used. These bit providers are provided with the capability to translate appropriate storage protocols.

Principals 1-n each have their own kernel 18a–18n for managing documents, such as documents 20a–20n. Documents 20a–20n are considered to be documents the corresponding principal 1-n has brought into its document management space. Particularly, they are documents that a principal considers to be of value and therefore has in some manner marked as a document of the principal. The document, for example, may be a document which the principal created, it may be an e-mail sent or received by the principal, a web page found by the principal, a real-time data input such as an electronic camera forwarding a continuous stream of images, or any other form of electronic data (including video, audio, text, etc.) brought into the DMS document space. Each of the documents 20a–20n have static properties 22 and/or active properties 24 placed thereon.

Document 20a, is considered to be a base document and is referenced by reference documents 20a–20c. As will be discussed in greater detail below, in addition to base document 20a having static properties 22 and/or active properties 24, base document 20a will also carry base properties 26 which can be static properties 22 and/or active properties 24 (Static properties are shown with a—and active properties are shown with a—o).

Reference documents 20a–20c are configured to interact with base document 20a. Both base documents and reference documents can also hold static properties 22 and/or active properties 24. When principals 2,3 access base document 20a for the first time, corresponding reference documents 20a–20c are created under kernels 18b–18c, respectively. Reference documents 20a–20c store links 28 and 30 to unambiguously identify their base document 20a. In particular, in the present invention each base document is stored with a document ID which is a unique identifier for that document. When reference documents 20a–20c are created, they generate links to the specific document ID of their base document. Alternatively, if principal n references reference document 20c, reference document 20n is created with a link 32 to reference document 20b of Principal 3. By this link principal n will be able to view (i.e. its document handle) the public properties principal 3 has attached to its reference document 20c as well as the base properties and public reference properties of base document 20a. This illustrates the concept of chaining.

The above described architecture allows for sharing and transmission of documents between principals and provides the flexibility needed for organizing documents. With continuing attention to FIG. 3, it is to be noted at this point that while links 28–30 are shown from one document to another, communication within DMS A is normally achieved by communication between kernels 18a–18n. Therefore, when DMS A communicates with either front-end components B, back-end components C, or communication occurs between principals within DMS A, this communication occurs through kernels 18a–18n. It is however, appreciated the invention will work with other communication configurations as well.

Using the described architecture, DMS A of the present invention does not require the principal to operate within a strict hierarchy such as in file or folder-type environments. Rather, properties 22,24 which are attached to documents allows a principal to search and organize documents in accordance with how the principal finds it most useful.

For instance, if principal 1 (owner of kernel 18a) creates a base document with content, and stores it within DMS A, and principal 2 (owner of kernel 18b) wishes to use that document and organize it in accordance with its own needs, principal 2 can place properties on Reference Document 20b. By placement of these properties, principal 2 can retrieve the base document in a manner different than that envisioned by principal 1.

Further, by interacting with browser 12, a principal may run a query requesting all documents having a selected property. Specifically, a user may run query language requests over existing properties.

Therefore, a point of the present invention is that DMS A manages a document space where properties are attached by different principals such that actions occur which are appropriate for a particular principal, and are not necessarily equivalent to the organizational structure of the original author of a document or even to other principals.

Another noted aspect of the present invention is that since the use of properties separates a document's inherent identity from its properties, from a principal's perspective, instead of requiring a document to reside on a single machine, documents in essence can reside on multiple machines (base document 20a can reside on all or any one of kernels 18a–18n). Further, since properties associated with a document follow the document created by a principal (for example, properties on document 20b of kernel 18b, may reference base document 20a), properties of document 20b will run on kernel 18b, even though the properties of document 20b are logically associated with base document 20a. Therefore, if a property associated with document 20b (which references base document 20a) incurs any costs due to its operation, those costs are borne by kernel 18b (i.e. principal 2), since properties are maintained with the principal who put the properties onto a document.

Bit Providers

As previously noted, an aspect of the present invention is the separation of a document's properties from a document's content, and that a user is able to retrieve the content of a document existing at a location separate from the properties. The DMS A architecture used to implement this retrieval is illustrated in FIG. 3. Particularly, bit provider 16 acts as a mechanism to retrieve content from external storage repositories 14a–14n. Bit providers are also provided with the capability to translate appropriate protocols when necessary. These bit providers are also configured to pull up properties from the underlying document storage system. The content which a bit provider is instructed to retrieve could be found in a World-Wide-Web page, a file system, e-mail server, or even dynamic data such as an electronic video feed, etc. Once content is retrieved, it is supplied to the requesting user. Use of bit providers allows DMS A to manage documents completely independently of how the documents are stored, i.e. where the content of base document 20a exists. Thus, a user or principal does not need to worry about where the bits of the content are actually existing. Rather, once within DMS A, a user or principal will simply view the content as a DMS A document and will perform management operations exactly the same way regardless of where the content is actually stored. This allows a single document management layer to run over a large variety of storage systems and storage architectures.

Bit providers work in terms of active properties. DMS A assigns responsibility for providing the document content to an active "bit provider" property. Code associated with the property handles all requests to read or write the document's content. This gives the property the ability to undertake additional kinds of activities. Among these are caching, meaning it can make a local copy of content that is otherwise stored remotely. A further activity is access control, where the bit provider is informed of the requester of each request, and can deny the request based on access control criteria. A further activity is configuration management. Particularly, since the bit provider mediates all requests for the document content, you can store the bits (if any) at any accessible place. Part of its decision of where to store them can be in response to configuration management information recorded in properties. Yet another activity of the bit provider is collections, specifically collections of documents. For collections, the "content" is actually a collection of other documents, and a bit provider manages the record of that collection. Another feature of bit providers is that they are replaceable, i.e. a particular base document may change from one bit provider, to another having different capabilities.

Figure 4:
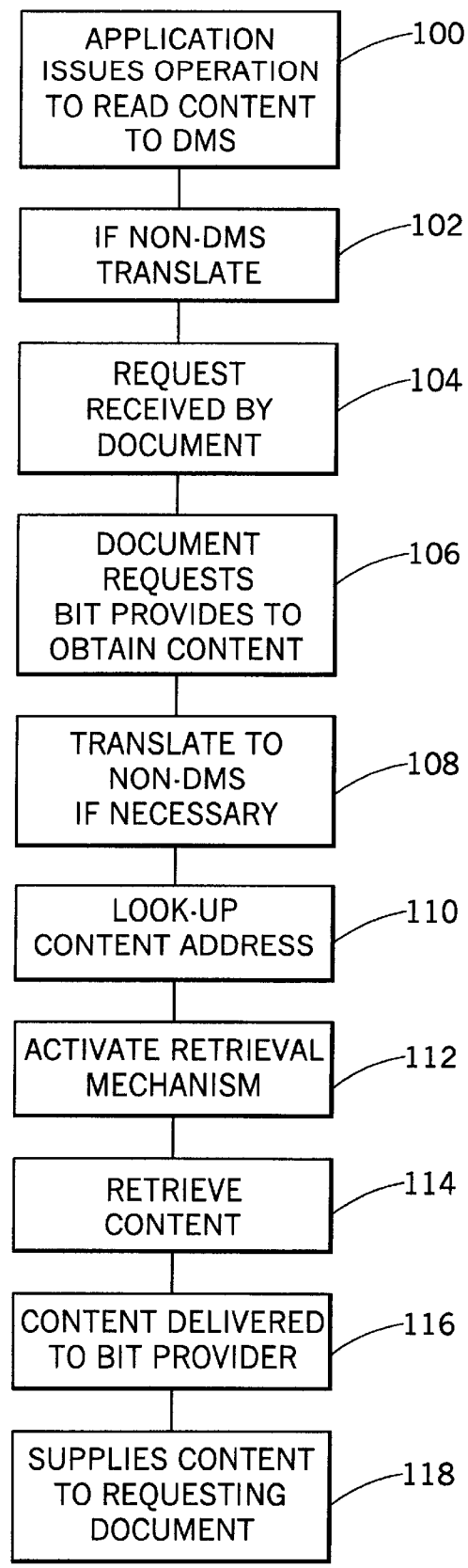
FIG. 4 is a flow chart showing retrieval of document content by a bit provider of the present invention.

Turning attention to FIG. 4, a flow chart of a request issued to DMS A requiring implementation of a bit provider is set forth.

An application issues a request to read the content of a document to DMS A (100). If this request is in a non-DMS-protocol, the request is translated (102). Thereafter the translated request (or the DMS-aware request) is received by the document (104). The document then forwards a request to its bit provider, asking for the content of the document (106). The bit provider knows the type of environment (WWW, hard disc, e-mail, etc.) in which the document content is stored and whether the requested document content can be obtained directly or whether a translation to a non-DMS-aware protocol is required (108). The translation step includes looking up the document content address for the known storage protocol (110). The bit provider then activates an appropriate retrieval mechanism to communicate with a storage system outside of DMS A (118). The storage system then retrieves the content (114) and returns it to the bit provider (120). Next, the retrieved content is supplied to the document whereby a user may view or otherwise manipulate the content of the document (118). From the foregoing, the procedures necessary for a request to write content are straightforward.

In the present embodiment the bit providers are configured to read/write content of a specific storage repository or system. It is to be appreciated however, that a bit provider which can read/write to a number of different storage systems or other on-line information sources is also possible.

As previously noted, bit providers are types of active properties which include at least the capability of knowing how to perform read/write content operations. Since it is in the form of a property, it is possible to attach bit providers to documents. The use of bit providers as its mechanism of retrieving data allows for a unified presentation of content to DMS A for document management.

The usefulness of bit providers can be understood by the following example. It is presumed that a new database repository, which has never previously existed, is now developed. If, under existing document management systems, a user wishes to access a document in this database repository through their mail applications, collections, web browser, etc., then it would be necessary to actively change the mail operation, the collections, the word processor, the user is presently operating to understand the new access protocols of the database repository. In other words, the user will have to teach each of its different applications how to access the new database repository. However, once a bit provider for this new database is implemented within the DMS A system, then all other applications, which know how to get content into DMS A can use the new database file without having to be individually reconfigured.

Thus, in existing systems, it is specific applications which have to understand the new database access protocols. However, by implementation of a bit provider in DMS A, since it is the document which has the knowledge to obtain content, i.e. in the form of the bit provider, the knowledge required is moved down into the system below the applications such that the applications do not have to be changed and can run in their existing fashion.

In DMS A, an application issues an operation request such as a read operation to a document, and then the document will ask the bit provider to perform an activity necessary to accomplish the requested operation.

Another aspect of the present invention is that each base document has encapsulated within it (i.e. bit providers) a special way of obtaining the bits which form the contents of its documents. Therefore, the document defers or delegates to the bit provider the actual mechanism for retrieving the bits of the content.

Figure 5:
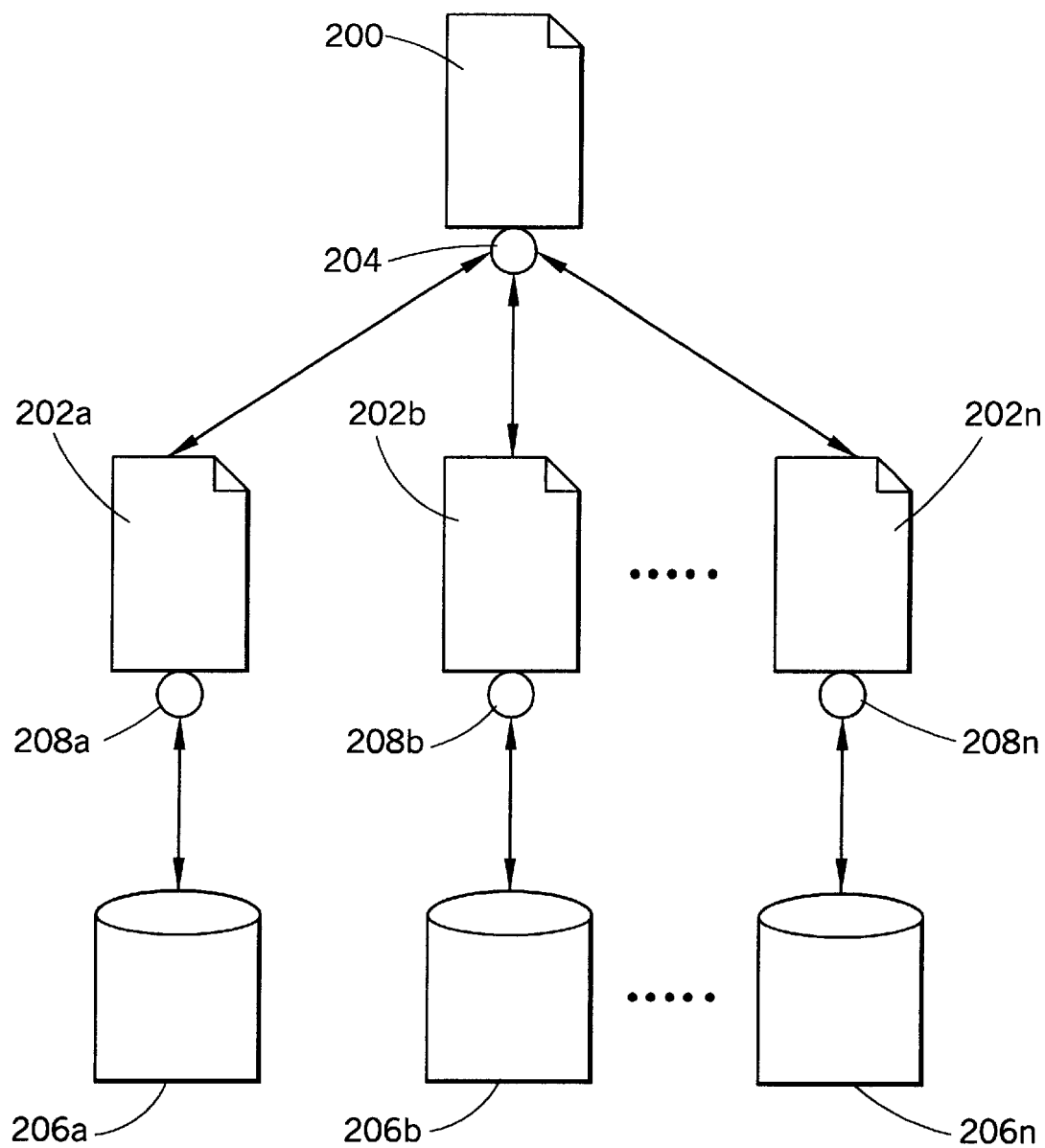
FIG. 5 depicts a document collection.

By having a unified manner of receiving content into DMS A, flexibility of the document management, not previously obtainable, is achieved. For example, in existing document management mechanisms, collections are represented in the same back-end repository as the files those collections contain. However, in DMS A, the representation of collections is separated from the representation of files. While file content can reside on a multiplicity of back-and repositories, collections can exist as light-weight properties, and are stored close to the user of the documents. This concept is illustrated in FIG. 5 which shows collection document 200 comprised of documents 202a–202n, which were retrieved by its bit provider 204. The content of collection document 200 is therefore the properties of documents 202a–202n which themselves have content in any of a number of different storage repositories 206a–206n retrievable by their bit providers 208a–208n. By this technique, collections are made "universal", that is, they can contain any type of content (web pages, normal files, mail messages, news postings, stock quotes, etc.), and they can be created by users even when no collection existed in the space created by the document producers.

However, in existing storage systems a "collection" of the documents is inherent in the back-end storage mechanism that represents the documents themselves, file systems define the symantics, not just of files, but also of the collections that contain those files (collections are "present" in the file system). Likewise, the WebDAV extensions to HTTP define collections in the same space as HTTP resources that can be thought of as documents.

On the other hand, DMS A collections are unique in that they can contain documents that reside in any back-end storage repository. This ability is a consequence of two facets of the DMS A architecture. First, DMS A can manage documents independently of the repository used to maintain the content of those documents. Second, DMS A collections are not made manifest in any back-end repository. They exist purely as properties on systems belonging to the document user.

The implications of this architecture are two-fold. First, users can create collections where none existed before. For example, a user can create a collection of web documents, for example, even if the provider of those documents has never implemented WebDAV. Second, because DMS A documents reference their content through a replaceable bit provider, collections can contain documents whose content exist in multiple back-and repositories. Therefore users can create an "important" collection containing not only files, but also web pages, mail messages, calendar appointments, etc.

Most interactions in DMS A are with documents as elements of document collections. Along with file system documents and Web documents, document collections are implemented as a document type, and so they are subject to all the same operations that can be applied to documents (including having associated properties, search and retrieval, and themselves being members of collections).

In the present embodiment, document collections comprise three elements (each of which can be null). The first is a query term. Query terms are specified in terms of document properties. Queries can test for the presence or absence of particular properties on a document, can test the specific value of a property, or can perform type-specific value comparisons (for instance, a wide range of date specifications can be provided, such as "changed within 2 hours" and "modified last week"). Query terms in document collections are "live." The collection contains the matching documents at any moment, so that documents may appear or disappear depending on their immediate state.

In addition to the query term, the document collection stores two lists of documents, called the inclusion and exclusion lists. Documents in the inclusion list are returned as members of the collection whether or not they match the query. Documents in the exclusion list are not returned as members of the collection even if they do match the query. When the query is null, the inclusion list effectively determines the collection contents.

So, the contents of the collection at any moment are the documents in the inclusion list, plus those matching the query, minus those in the exclusion list. We call these three-part structures "fluid collections." The goal of this implementation of document collections is to support a natural style of document organization and retrieval. A query can be used to create an initial collection, or to specify the default membership. However, membership can be refined without having to reformulate the query, but by direct manipulation of the document collection contents. Items can be added and removed to override the results of the query, and these changes will be persistent. The browser also supports the direct manipulation of query terms, so that reformulating the query is a fairly straightforward operation.

Virtual Document Construction

As previously described, the document management system (DMS) A of the present invention is located in a communication path between front-end components B and back-end components C of the computer system. When a request to retrieve a document is issued through one of front-end components B, the request is delivered to DMS A, which then communicates with the back-end components C to obtain the contents of the desired document. As previously discussed, the back-end components can include numerous distinct data storage repositories including a resident storage disc, relational database, web site, or any other of electronic data storage mechanism. Bit providers carried on documents are used by DMS A to interface with the storage repositories The generation of virtual documents is based on a recognition that a one-to-one correspondence between a document and where the content of the document is stored is not required in DMS A. Specifically, content for a single document can be dispersed among numerous storage repositories. An example of the foregoing is illustrated in connection with FIG. 6 where a principal, through browser 300, issues a request to retrieve the content for a document 302. Document 302 then instructs bit provider 304 to retrieve the content of document 302. When bit provider 304 undertakes the task of retrieving the content of document 302, it determines the content is stored among a variety of storage repositories. Therefore, bit provider 304 is required to retrieve parts of content from each of the separate repositories (repository(A), 306, repository(B), 308, and repository(n), 310). Bit provider 304 then combines the content from the separate repositories and delivers the combined content 312 to document 302. Thus, the single document viewed by the principal is in actuality distinct content retrieved from separate repositories. From the preceding, the fact that DMS A does not require a one-to-one correspondence between document content and where that content is stored, allows content for a single document to be stored across a plurality of data storage repositories.

This concept is further illustrated by the flow chart of FIG. 7. In this description, an input device such as a browser is used to issue requests 320. The request in this scenario is for the content of a document with a predetermined property (e.g., title=, author=, publication=, etc.). DMS A receives the request directly if the input device is DMS-aware, if not DMS-aware, the request is translated 322. The document then receives the request 324, and in turn issues its own request to a bit provider attached to the document to retrieve the contents of that document 326. The bit provider looks up the address for the requested content and determines the storage repositories which hold the document content 328, and then activates mechanisms to retrieve the content from each of the repositories 330. The returned content is then combined by the bit provider into an arrangement corresponding to the requested document 332. The content is then delivered to the document for viewing by the principal 334.

Figure 8:
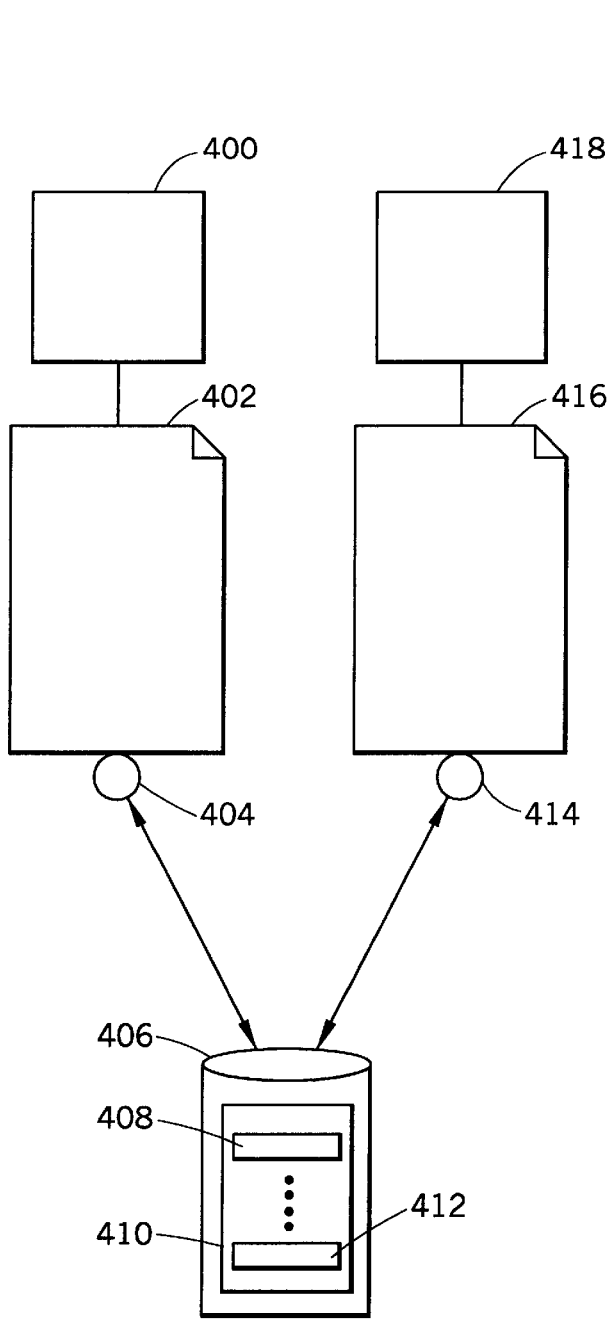
FIG. 8 depicts a virtual document wherein the contents of the document are smaller than a single file on a storage repository.

In addition to the foregoing scenario, a virtual document may also be a document whose content is only a portion of a larger file. For example, as shown in FIG. 8, when a principal 400 issues a request for content of a document 402, the bit provider 404 attached to that document is requested to retrieve the content for the document. The bit provider looks-up the address for the content and determines that that content exists within a particular repository 406. However, unlike the previous example, where the requested document's content included all the data such as a file, in the present embodiment the desired content is only a sub-portion 408 of a file 410. The sub-portion 408 of the total content of file 410 is retrieved by bit provider 404 and is delivered to the document 402. From that same file 410, sub-content 412 could be retrieved by a bit provider 414 carried on a document 416 (retrieved due to a request from another principal 418). In both cases, from the perspective of each principal, the document content being viewed is considered to be a complete document.

Figure 9:
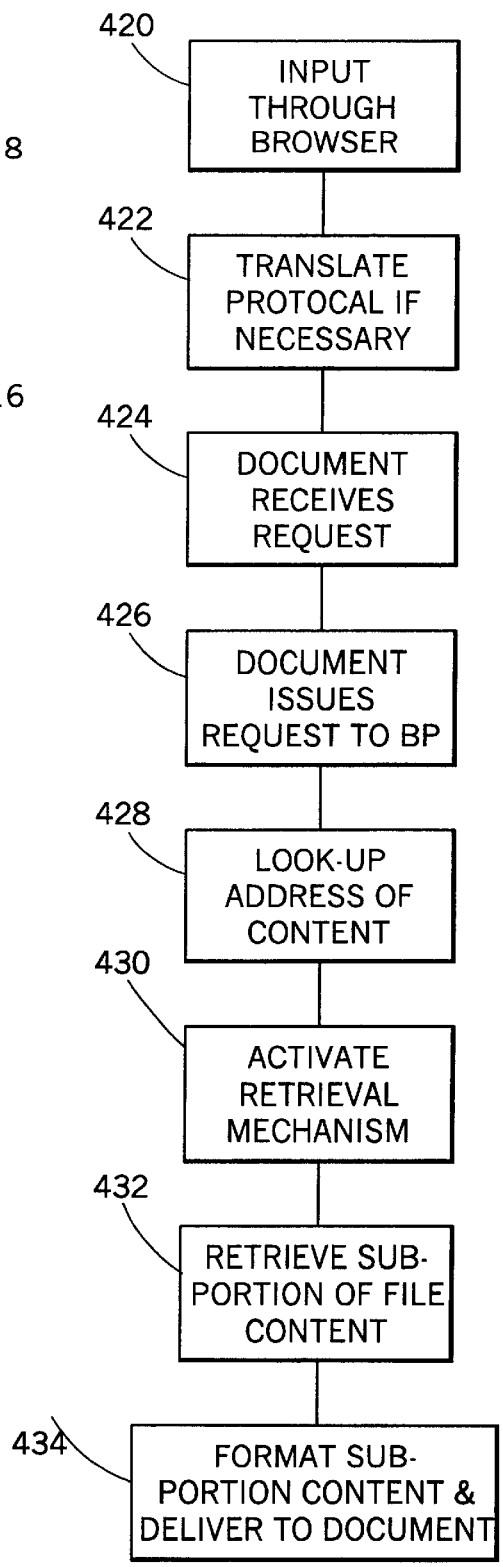
FIG. 9 is a flow chart with regard to FIG. 8.

To more fully explain the above, attention is directed to the flow chart of FIG. 9. In this embodiment, similar to the discussion of FIG. 8, a principal issues a request through an input device such as a browser 420, to retrieve the content for a document. If required, the request is translated 422, and then delivered to the document 424. The document in turn requests bit provider to retrieve the content of the document 426. The bit provider looks-up the address of the content 428. Using this information, the content provider determines the content is a portion of a larger unitary content such as a file. The content provider then activates a retrieval mechanism 430 and retrieves only that portion of the unitary content necessary to meet the request issued by the user 432. The retrieved sub-content is then delivered to the requesting document 434.

One example of a situation where a single requested document may be found in separate repositories would be a multi-media presentation including sound, pictures and text. It may be more efficient to store the audio, video and text portions in three separate repositories specifically designed for such information. However, when a document, such as a presentation document, is requested by a user which includes these elements, the present invention will generate this virtual document within DMS A such that it is presented to the principal as a complete document. Therefore the principal will never need to know that the individual elements were stored in separate repositories.

With attention to an example of a virtual document which uses sub-content of a larger content, it is noted as being common practice for e-mail systems to store incoming e-mail messages in a single file. In the present invention, the content provider would select the e-mail message according to the requested properties and deliver that sub-content as the requested document.

Figure 10:
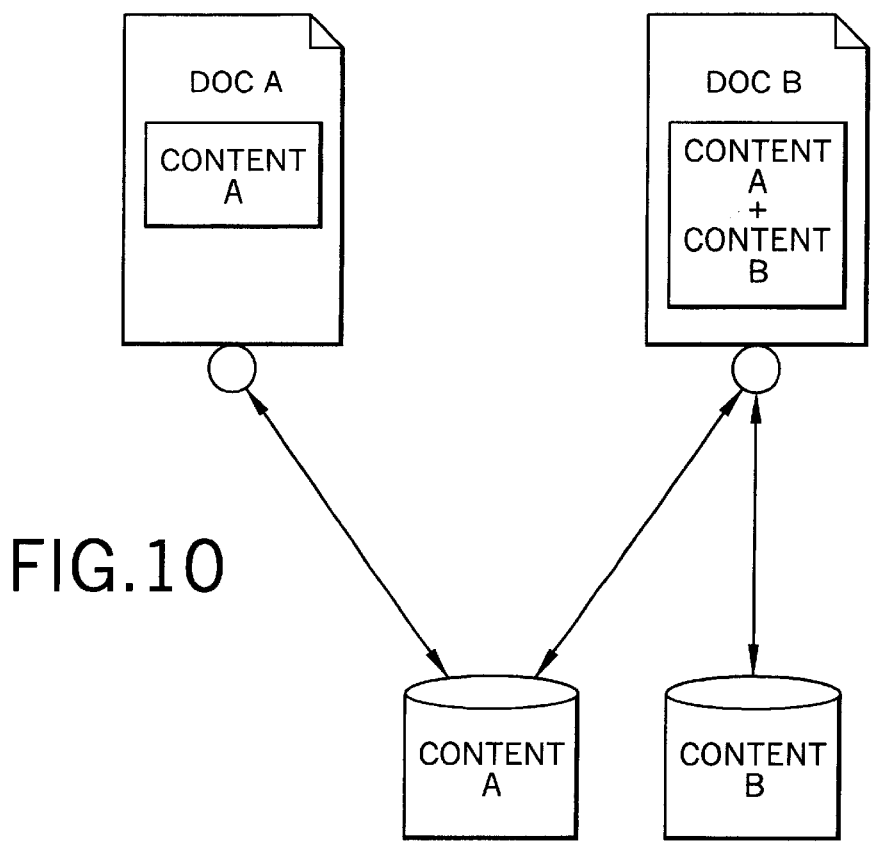
FIG. 10 depicts that content on a repository which for one document is the complete document, can be a portion of another document.

Turning attention to FIG. 10, it is illustrated that a single piece of content (CONTENT A) may be considered both the entire content of a single document (DOC A) or a sub-portion of content for another document (DOC B), i.e., where the other document (DOC B) includes more than a single location for its content (CONTENT A and CONTENT B, from separate repositories).

Figure 11:
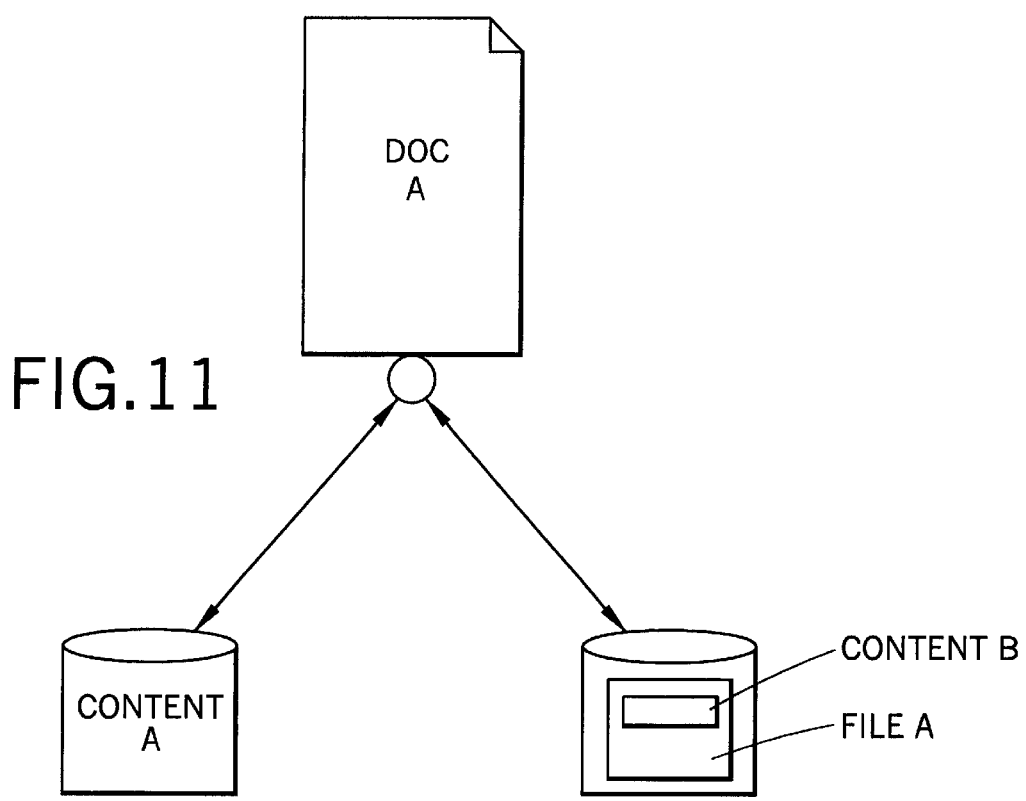
FIG. 11 illustrates that a document can be combined with content from more than a single repository wherein one of the portions of the content are smaller than a complete file on a repository.

Further, with attention to FIG. 11 it is also noted that when content for a document (DOC A) is found on more than a single repository, a sub-portion of that content may be a complete file (CONTENT A), while the additional content on the other repository may be a sub-portion (CONTENT B) of a larger file (FILE A).

Thus, it is to be appreciated that virtual documents are directed to a notion regarding the relationship between documents in DMS and the files or other repositories or on-line information sources outside of DMS that provide the content. Since the present invention has separated the content of a document from that document's properties, there is no longer a need for a one-to-one correlation between a document and the contents which make up that document. Furthermore, it is noted that virtual documents as described in the present invention are full-fledged DMS documents, each affording all the benefits thereof (property-attachment, membership in collections, indexing, backup, and other DMS activities).

The invention has been described with reference to the preferred embodiment. Obviously, modifications and alterations will occur to others upon reading and understanding of this specification. It is intended to include all such modifications and alterations in so far as they come within the scope of the appended claims or the equivalents thereof.

Having thus described the present invention, it is now claimed:

1. A method of generating a virtual document in a document management system comprising:

issuing a request by an application of the document management system for a document;

receiving the request by the document;

sending a request from the document to a bit provider capable of performing read/write operations to retrieve or store content of the document;

determining, by the bit provider, addresses of the content, wherein the content addresses are for more than one storage repository, and the content of the document is stored completely separate from the bit provider;

retrieving, by the bit provider, via a read operation, the content located in the more than one storage repository, wherein each of the storage repositories storing content hold a sub-portion of the document content;

combining the sub-portions of the content;

presenting the combined sub-portions of the document content to a user, wherein the user perceives the combined sub-portions as a single document; and storing the contents of the document in the more than one storage repository via the bit-provider write operator.

2. The method according to claim 1 further comprising:

determining at least some of the content is a portion of a file located in at least one of the storage repositories or other on-line information sources.

3. The method according to claim 1 wherein the generated virtual document is a full-fledged document of the document management system.

4. The method according to claim 1 wherein the bit provider further provides caching of the retrieved contents of the document to a local storage area.

5. The method according to claim 1 wherein the bit provider further provides access control to the document content.

6. The method according to claim 1 wherein the bit provider further includes configuration management information.

7. The method according to claim 1 wherein the bit provider further includes collections of documents stored in the more than one storage repository.

8. The method according to claim 1 wherein the bit provider further includes the capability to translate protocols.

9. A method of generating a virtual document in a document management system comprising:

issuing a request by an application of the document management system for a document;

receiving the request by the document;

sending a request from the document to a bit provider capable of performing read/write operations to retrieve or store content of the document, wherein the content of the document is stored completely separate from the bit provider;

determining, by the bit provider, addresses of the content, wherein the content addresses are for data which is less than an entire file within a single storage repository;

retrieving, by the bit provider, via a read operation, the content located in less than an entire file of the storage repository, wherein the file in the storage repository storing the content holds additional data not included as part of the document content;

presenting the formatted content to a user, wherein the user perceives the content as a single document; and storing the contents of the document in the more than one storage repository via the bit provider write operation.

10. The method according to claim 9 wherein the generated virtual document is a full-fledged document of the document management system.

11. The method according to claim 9 wherein the bit provider further includes the capabilities of:

caching of the retrieved document contents to a local storage area;

providing access control to the contents of the document;

providing configuration management information;

including collections of documents stored in the more than one storage repository; and translating protocols of the document where appropriate.

12. A method of generating a document in a document management system of a computer system which includes at least one application for issuing instructions and a plurality of data storage repositories, the method comprising:

providing a first user of the computer system with access to properties of the document management system;

attaching by the first user, selected ones of the properties to a document of the document management system;

storing the attached selected properties;

storing content of the document, among more than one of the data storage repositories, separate from a location where the selected properties are stored;

issuing a first request, by the first user, for the document;

receiving the request by the document;

issuing a request, from the document, to a bit provider capable of performing read/write operations and attached to the document, to retrieve or store the content of the document, wherein the bit provider is stored completely separate from the content of the document;

determining, by the bit provider, the content is located in the more than one storage repository, wherein each of the storage repositories storing the content of the document holds sub-portions of the content of the document;

retrieving, by the bit provider via a read operation, the desired content located in the more than one storage repository, wherein each of said repositories hold a sub-portion of the document content;

combining the sub-portions of the content;

presenting the combined sub-portions to the first user, wherein the first user perceives the combined sub-portions as a single document; and storing the contents of the document in the more than one storage repository via the bit provider write operation.

13. The method according to claim 12 wherein the first user has a capability of interacting with the presented document in the same manner as a document retrieved from a single storage repository.

14. The method according to claim 12 wherein the single document is a full-fledged document of the document management system.

15. The method according to claim 12 wherein the bit provider further includes the capabilities of:

caching of the retrieved document contents to a local storage area;

providing configuration management information; and translating protocols of the document where appropriate.

16. A document management system of a computer system capable of forming virtual documents including at least one application for issuing instructions and a plurality of data storage repositories, the document management system comprising:

a plurality of properties of the document management system;

a document of the document management system to which are attached selected ones of the properties;

content of the document stored at locations separate from where the selected properties are stored, the content stored among more than one of the data storage repositories;

a bit provider attached to the document and capable of performing read/write operations, the bit provider configured to retrieve the content of the document via a read operation, and the bit provider being stored completely separate from the content of the document;

where the bit provider determines the locations of the content in the more than one storage repository, wherein each of the storage repositories storing the content of the first document holds sub-portions of the content of the first document;

the retrieved sub-portions are presented to the first user, wherein the first user perceives the combined sub-portions as a single document; and the first user storing contents of the document in the more than one storage repositories via a write operation of the bit provider.

17. The virtual document according to claim 16 wherein the virtual document is a full-fledged document of the document management system.

18. The document management system according to claim 16 wherein the bit provider further comprises:

storing retrieved contents of the document to a cache in a local storage area;

information concerning configuration management;

ability to translate protocols of documents where appropriate.

* * * * *